United States Patent

Doversberger et al.

[15] 3,693,048

[45] Sept. 19, 1972

[54] FAIL OPEN SEMICONDUCTORS

[72] Inventors: Kenneth W. Doversberger, Kokomo; Thomas J. Furnival, Logansport, both of Ind.

[73] Assignee: General Motors Corporation, Detroit, Mich.

[22] Filed: Oct. 19, 1970

[21] Appl. No.: 81,889

[52] U.S. Cl. ...........317/33 R, 317/40 A, 317/235 Q, 337/4

[51] Int. Cl. ...............................................H02h 5/04

[58] Field of Search.....317/33 R, 40 R, 40 A, 41, 235 Q, 317/234; 337/295, 1, 3, 4, 6, 293, 375

[56] References Cited

UNITED STATES PATENTS

| | | | |
|---|---|---|---|
| 1,738,113 | 12/1929 | Ogden | 317/234 |
| 3,164,702 | 1/1965 | Ruckriegel | 337/375 X |
| 3,240,908 | 3/1966 | Marcoux | 337/375 X |
| 943,698 | 12/1909 | Murray | 337/293 |
| 3,558,989 | 1/1971 | Dameme | 317/41 |
| 3,486,155 | 12/1969 | McCaughna | 337/295 X |
| 3,027,502 | 3/1962 | Moriguchi | 317/235 Q |

FOREIGN PATENTS OR APPLICATIONS

| | | | |
|---|---|---|---|
| 896,996 | 5/1962 | Great Britain | 337/295 |
| 67,036 | 11/1943 | Norway | 337/295 |

*Primary Examiner*—William M. Shoop, Jr.
*Assistant Examiner*—Harvey Fendelman
*Attorney*—Jean L. Carpenter and Paul Fitzpatrick

[57] ABSTRACT

A circuit element which includes a fusible device and a semiconductor device series-connected in an integral casing. When a power supply passes a current larger than a predetermined value through the fusible device, fusion takes place in the fusible device so as to prevent the current from changing the semiconductor device into a short circuit across the power supply.

In a second embodiment the circuit element also includes a switch that is opened in response to heating of the semiconductor device above a certain temperature. The switch is series-connected with the fusible device and the semiconductor device so as to disable the circuit element until the semiconductor device temperature is below the certain temperature. The circuit element of the second embodiment also includes a lamp for indicating when the fusible device has fused and the semiconductor device has become a short circuit.

1 Claim, 10 Drawing Figures

INVENTORS
Kenneth W. Doversberger
BY & Thomas J. Furnival
Paul Fitzpatrick
ATTORNEY INVENTORS
Kenneth W. Doversberger
BY & Thomas J. Furnival
Paul Fitzpatrick
ATTORNEY

FAIL OPEN SEMICONDUCTORS

This invention relates to fused circuit elements and, more particularly, to a circuit element for protecting circuit loads from excessive voltage nd current transients.

In the instrumentation field, electrical loads and electrical circuits are often subjected to undesirable voltage or current transients due to extraneous radiation or an abnormal condition in another portion of the circuit, such as a spurious capacitive discharge. It has therefore been a general practice to place a transient-suppressing circuit element in parallel with an electrical load so as to provide a current path through which transients may pass without damaging the circuit load being protected. For example, a Zener diode is often connected in parallel with a load for maintaining the voltage across the load at a predetermined level. Should a voltage of a higher level be applied across the parallel combination, the current through the Zener diode is increased sufficiently to maintain the voltage across the load at the desired level. However, these transient currents may destroy the Zener diode and result in its becoming a short circuit.

To prevent this occurrence from shorting the load and the power supply which energizes the load, it is common practice to place a fuse in series with a Zener diode which is employed in this fashion. Accordingly, when the Zener diode is short-circuited, the fuse is blown, or fused, so as to open the current path through the Zener diode. After the condition which destroyed the fuse and the Zener diode has been corrected, in these prior systems, it has heretofore been necessary to individually replace both the fuse and the Zener diode with new components. It is thus apparent that considerable and unnecessary expenses arise in manufacturing the Zener diode and the fuse as two discrete circuit elements, connecting both the Zener diode and the fuse in a circuit, and replacing both the Zener diode and the fuse in the circuit after they have been destroyed by a transient voltage condition. To eliminate this problem of handling two discrete elements, we have heretofore designed a circuit element which contains a Zener diode in series with a switch that is responsive to both the temperature of the Zener diode and the current through the switch. This circuit element is the subject of our copending United States patent application Ser. No. 842,516. However, the manufacturing cost of our prior circuit element has yet to be reduced sufficiently for it to become an article of commerce.

It is therefore an object of this invention to provide a circuit element having both a semiconductor device and a fuse of a unique design housed within a single casing for use in the aforedescribed application.

It is another object of this invention to provide a circuit element which contains within an integral casing a semiconductor device, a fuse, and a switch that is responsive to the semiconductor device temperature in series with the semiconductor device and the fuse.

It is a further object of this invention to provide a circuit element which includes a semiconductor device, a switch that is responsive to the temperature of the semiconductor device, and a fuse in a single casing, the circuit element also including a light in parallel with the fuse for indicating when the fuse is blown and the semiconductor device has been shorted by a voltage transient.

The aforementioned and other objects and advantages of the subject invention will become apparent from the following description and drawings, in which.

Figure 5:
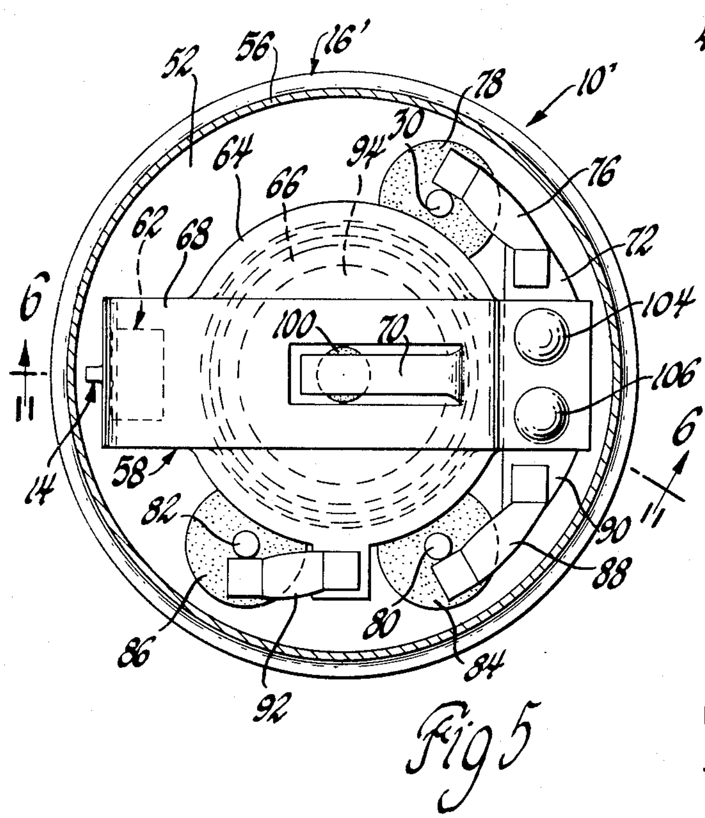
FIGS. 5 and 6 illustrate a second embodiment of the circuit element of FIG. 1.
Figure 6:
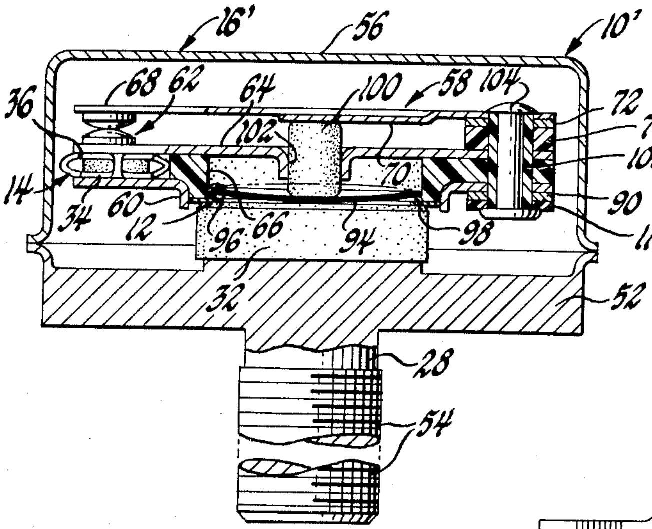
Figure 7:
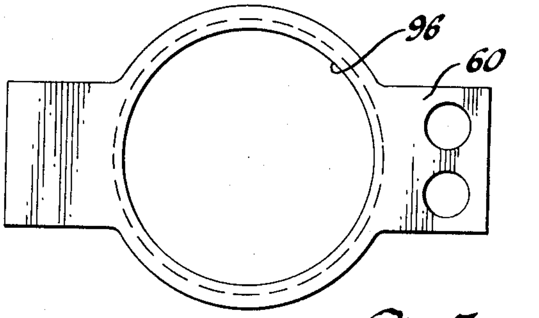
Figure 8:
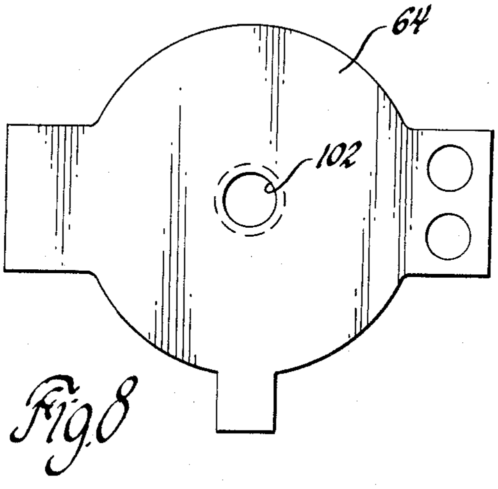
Figure 9:
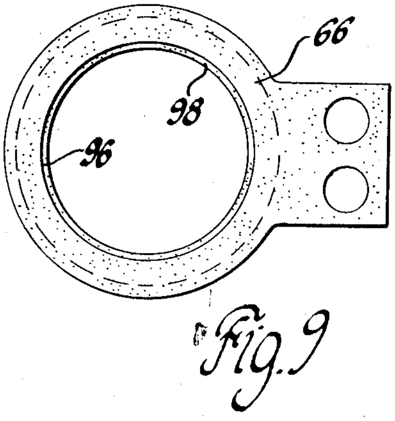
Figure 10:
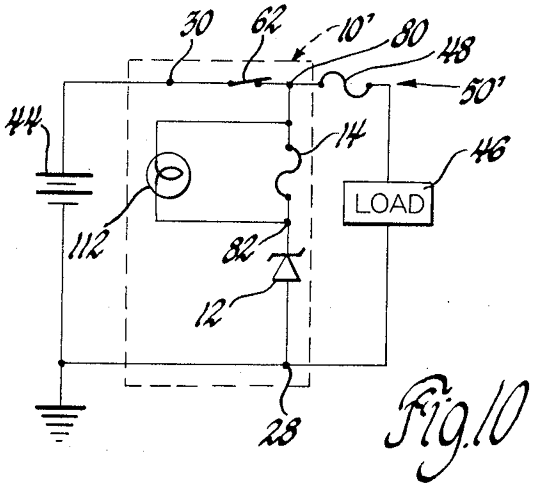

FIGS. 7 through 9 illustrate in detail various structural components employed in the circuit element of FIGS. 5 and 6; and FIG. 10 is a schematic diagram of a circuit which includes the circuit element of FIGS. 5 and 6.

Figure 1:
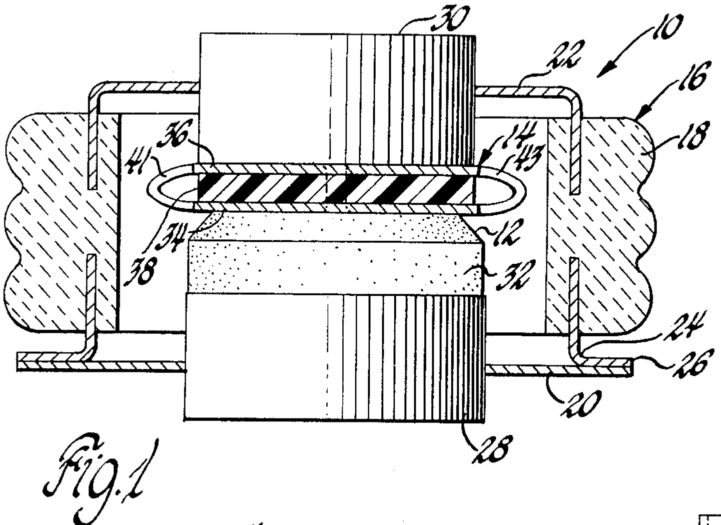
FIG. 1 illustrates a cross-sectional view of a circuit element embodying the principles of the subject invention.

In the embodiment illustrated in FIG. 1, a circuit element 10 is provided which includes a semiconductor device 12 and a fusible device 14 mounted within a casing 16 that presents the circuit element 10 as an integral unit.

While the casing 16 may be of any conventional design, it is illustrated in FIG. 1 as including a cylindrical insulator 18 of a suitable material, such as a ceramic, that is enclosed at each end by first and second end covers 20 and 22. To facilitate construction of the casing 16, the second end cover 22 and an annular metal connector 24 having a radially directed flange 26 may be embedded in the ceramic insulator 18 when it is being manufactured. By making the end covers 20 and and 22 of a suitable metal, such as copper, the casing 16 may be sealed closed by subsequently brazing the first end cover 20 to the flange 26 of the metal connector 24.

First and second copper terminals 28 and 30, which may be brazed to the respective first and second end covers 20 and 22 are provided for connecting external leads (not shown) to the circuit element 10. The first terminal 28 is electrically connected to one side of the semiconductor device 12 through an isolation layer 32. The semiconductor device 12 is made of a semiconductor material, such as silicon, which has a thermal coefficient of expansion considerably different than that of the copper first terminal 28. Accordingly, if the first terminal 28 is mechanically connected to the semiconductor device 12 and the temperature of the circuit element 10 is increased, the dissimilar thermal coefficients of expansion would introduce thermal stresses in the semiconductor device 12 which would probably break the semiconductor device 12. However, by making the isolation layer 32 of a conductive material that has a thermal coefficient of expansion similar to that of the semiconductor device 12, such as tungsten of molybdenum, thermal stresses in the semiconductor device 12 are prevented, though the semiconductor device 12 is electrically connected to the first terminal 28 through the isolation layer 32. Even through the thermal coefficients of expansion of the isolation layer 32 and the first terminal 28 are not the same, the isolation layer 32 is made sufficiently thick to prevent the transmission of any resultant stresses from the first terminal 28 to the semiconductor device 12.

Figure 3:
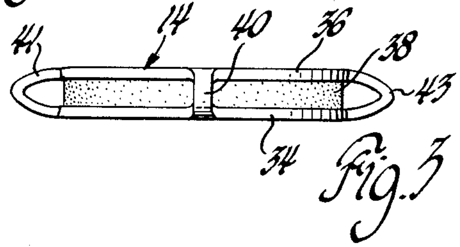
FIGS. 2 and 3 illustrate a fuse of a unique design which is employed in the circuit element of FIG. 1.
Figure 2:
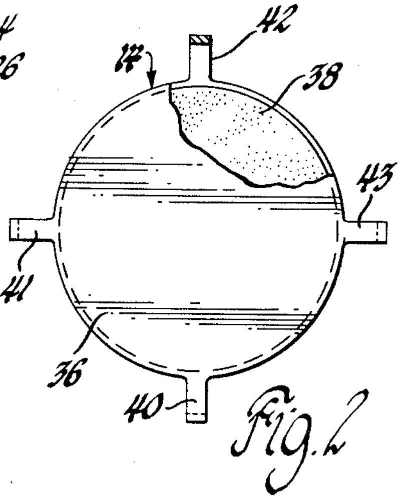

As previously mentioned, the second terminal 30 in the illustrated embodiment is also made of copper and is brazed to the second end cover 22. The second terminal 30 may also be brazed to the fusible device 14 which, as shown in greater detail in FIGS. 2 and 3, is comprised of first and second conductive plates 34 and 36 that are held substantially parallel by an insulator plate 38 to which they are secured, as by a suitable adhesive. The first and second conductive plates 34 and 36 are electrically connected by a plurality of identical conductors 40 through 43 that, by way of example, may be ribbons made of a lead-tin alloy having a predetermined and relatively low melting point.

Since the conductors 40 through 43 each have a relatively small cross-sectional area, the currents which pass through the fusible device 14 cause each of the conductors 40 through 43 to become a heat source. Accordingly, when a current larger than a predetermined value passes through the fusible device 14, the heat generated by the current in the conductors 40 through 43 causes each of the conductors 40 through 43 to melt or fuse. For example, as fusion takes place in the conductor 40, the cross-sectional area through which the current passes is further reduced, causing fusion of the remaining conductors 41 through 43 in quick succession. The number of conductive ribbons which connect the conductive plates 34 and 36 may thus be selected to optimize the current-responsive characteristics of the fusible device 14. As persons versed in the art will appreciate, increasing the number of ribbons makes the fusible device 14 less sensitive to current transients of short duration and partially negatives the effect of mechanically breaking a single ribbon through vibration of the circuit element 10. Similarly, spacing the ribbons equally about the periphery of each of the conductive plates 34 and 36 prevents a current unbalance between the ribbons.

By electrically connecting the first conductive plate 34 to the semiconductor device 12 through a suitable means of attachment, the fusible device 14 and the semiconductor device 12 are series connected between the first and second terminals 28 and 30. The circuit element 10 may be connected in a circuit for operation in the fashion which will now be explained in regard to FIG. 4.

Figure 4:
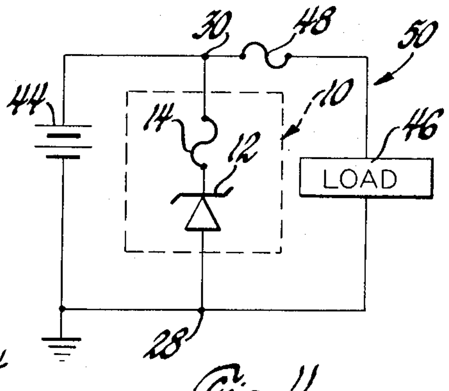
FIG. 4 is a schematic diagram of a circuit which includes the circuit element of FIG. 1.

In FIG. 4 a power source in the form of a battery 44 is employed to energize a suitable electrical load 46 through a fuse 48, illustrated as part of a circuit 50. The circuit element 10, containing the semiconductor device 12 and the fusible device 14, is connected in parallel with the battery 44 for controlling the voltage which is applied to the load 46. Since a Zener diode is a semiconductor device which is widely used as a voltage regulator, the semiconductor device 12 will hereafter be referred to as being a Zener diode, although it is apparent that the subject invention need not be so restricted. For descriptive purposes, it is therefore convenient to assume that the voltage rating of the battery is the same as the break-down voltage rating of the Zener diode 12, such as 28 volts DC, and that an extraneous power source (not shown) occasionally introduces voltage transients into the circuit 50 that tend to increase the voltage at the second terminal 30 above 28 volts DC.

Accordingly, when the battery 44 is the sole voltage source in the circuit 50, there is no substantial current through the circuit element 10 and the load 46 draws a normal current from the battery 44 through the fuse 48. Should the current through the load 46 become excessive, the fuse 48 will blow so as to open the current path through the load 46 and thus protect the battery 44 from the excessive demands being placed upon it by the load 46.

In the event a voltage transient is introduced into the circuit 50 in a manner which tends to increase the voltage at the second terminal 30, the circuit element 10 will conduct sufficient current to maintain the voltage at the second terminal 30 at 28 volts DC. The Zener diode 12 thus protects the load 46 from excessive voltage. Should the voltage transient be of such magnitude and duration that the power rating of the Zener diode 12 is exceeded the Zener diode 12 will be destroyed in a fashion which normally results in its becoming a closed circuit. When this occurs, the full voltage between the terminals 28 and 30 is applied across the fusible device 14. The resultant current through the fusible device 14 is greater than the predetermined current, causing the fusible device 14 to fuse so as to open the current path through the Zener diode 12 and prevent the shorted Zener diode 12 from harming the battery 44. Replacement of the entire circuit element 10 is then in order.

After the circuit element 10 has been destroyed, any subsequent voltage transients will be transmitted to the load 46 through the fuse 48 which, as previously stated, will blow if the current through the load 46 becomes excessive. When the fuse 48 is blown the circuit 50 becomes totally inoperative, and both the circuit element 10 and the fuse 48 need to be replaced. It is thus apparent to persons versed in the art that the circuit element 10 protects the battery 44 and the load 46 under a wide range of conditions and that the fuse 48 provides additional protection against excessive currents even after the circuit element 10 is destroyed.

In the embodiment disclosed in FIGS. 5 through 9, the circuit element 10′ includes a casing 16′ of a different configuration than that previously discussed. In this embodiment the casing 16′ includes a base plate 52 having an integral threaded stud 54, which forms the first terminal 28, and a cover 56 which is brazed to the base plate 52. In addition to the fusible device 14 and the Zener diode 12, the casing 16′ also houses a switch assembly 58 that is responsive to the temperature of the Zener diode 12 and is connected in series circuit with the Zener diode 12 and the fusible device 14 between the first and second terminals 28 and 30.

As best shown in FIGS. 5 and 6, one side of the Zener diode 12 is electrically connected to the first terminal 28 through the isolation layer 32, as previously described. The other side of the Zener diode 12 is connected to the first plate 34 of the fusible device 14 through a heat transferring connector member 60, which is shown in greater detail in FIG. 7. The second conductive plate 36 of the fusible device 14 is connected to a set of contacts 62 through a lower contact support member 64. The lower contact support member 64 is shown in greater detail in FIG. 8 and is insulated from the connector member 60 by an insulating spacer 66 that is made of a suitable insulating material, such as plastic, and is illustrated in detail in FIG. 9. The contacts 62 are connected to the second terminal 30 through an upper contact support member 68 which has a depending leaf spring 70, a conductive flange 72 insulated from the lower contact support member 64 by an insulator 74, and a cable 76. As best shown in FIG. 5, the second terminal 30 extends through the base plate 52 so as to facilitate the connection of an external lead (not shown) to the second terminal 30, which is insulated from the base plate 52 by an insulator 78. Third and fourth terminals 80 and 82, which also extend through the base plate 52 and are insulated from the base plate 52 by insulators 84 and 86, are also provided for electrically connecting external leads (not shown) to the circuit element 10. The third terminal 80 is connected to the connector member 60 through a cable 88 and a conductive flange 90, while the fourth terminal 82 is connected to the lower contact support member 64 through a cable 92.

To facilitate the sensing of the Zener diode 12 temperature by the switch assembly 58, a bimetal snap disc 94 is positioned within a cavity 96 formed in the connector member 60. The periphery of the snap disc 94 rests on a lip 98 in the spacer 66. Accordingly, when the temperature of the snap disc 94 is below a certain level the snap disc 94 is in its illustrated solid line position in which the central portion of the snap disc 94 is held in heat-transfer relation with the connector member 60 by a plunger 100 made of a suitable insulating material such as plastic. The plunger 100 is held against the snap disc 94 by the spring 70 and is slidably positioned in an aperture 102 formed in the lower contact support member 64. Since only the spring 70 engages the upper end of the plunger 100, flexure of the upper contact support member 68 serves to maintain the contacts 62 tightly closed, the upper contact support member 68 being firmly secured to the various other elements in the switch assembly 58 by a pair of rivets 104 and 106 which are electrically isolated from the various other elements by an insulating spacer 108 and washer 110.

The operation of the circuit element 10′ will now be explained by reference to the circuit 50′ in FIG. 10 in which the circuit element 10′ is connected to protect the load 46, as previously discussed in regard to FIG. 4. However, in FIG. 10 the switch formed by the contacts 62 is connected in series with the load 46 so as to maintain the voltage across the load 46, which is connected between the first and third terminals 28 and 80 at a predetermined If In the event the voltage at the second terminal 30 tends to be increased above 28 volts DC, which is the break-down voltage rating of the Zener diode 12, the resultant current through the Zener diode 12 causes internal heating of the Zener diode 12 which raises its temperature. Since the central portion of the snap disc 94 is in good heat transfer relation with the Zener diode 12 through the connector member 60, the snap disc 94 monitors the temperature of the Zener diode 12. If the Zener diode 12 temperature, as sensed by the snap disc 94, exceeds the certain temperature, the snap disc 94 snaps to the position illustrated by the dotted lines in FIG. 6, pressing the plunger 100 against the spring 70 so as to raise the upper contact support member 68 and separate the contacts 62. When this occurs, both the circuit element 10′ and the load 46 are temporarily disabled until the snap disc 94 has cooled sufficiently for it to snap back to its illustrated solid line position. When the snap disc 94 returns to its solid line position, the contacts 62 are closed, which energizes the circuit element 10′ and the load 46 as earlier described.

Should a transient voltage that is introduced to the circuit 50′ destroy the Zener diode 12 and make it a short circuit the resultant current through the Zener diode 12 blows the fusible device 14 and renders the circuit element 10′ in need of replacement, as previously described. When this occurs a blown fuse indicator, such as a lamp 112, that is responsive to the voltage across the third and fourth terminals 80 and 82 may be employed to indicate that the circuit element 10′ is no longer protecting the load 46 against voltage transients.

As shown in FIG. 10, the voltage across the lamp 112 remains near zero so long as the fusible device 14 is intact; but should the Zener diode 12 be shorted and the fusible device 14 be blown, the battery 44 applies 28 volts DC across the lamp 112. By selecting the lamp 112 to be of a type which operates at 28 volts DC, the lamp 112 thus serves to indicate that the circuit element 10′ needs to be replaced. Accordingly, it is desirable that the lamp 112 be physically located where it may readily be observed. In FIG. 10, the lamp 112 is schematically illustrated as being located within the circuit element 10′ where it could be observed through a window (not shown) provided in the cover 56. Of course, if it may be more readily seen by an observer at a remote location, such as on a control console (not shown), the lamp 112 may be physically located outside the circuit element 10′ and connected by suitable leads (not shown) to the third and fourth terminals 80 and 82 in the fashion schematically illustrated in FIG. 10, as will be appreciated by persons versed in the art.

While the present invention has been described in connection with the illustrated embodiments, persons versed in the art will appreciate that various other modifications of the subject apparatus may be made without departing from the spirit of this invention.

What is claimed is:

1. A semiconductor unit comprising in combination;

a semiconductor element having spaced substantially parallel faces between which current flow takes place in normal use and at least one semiconductor junction therebetween, the element being subject to failure to a short circuit state when its power rating is exceeded;

a pair of spaced imperforate plates of conducting material complementary to and substantially coextensive with one of said faces, one of said plates being in abutting relation to said one face;

a thin plate of electrically insulating material complementary to and substantially coextensive with said spaced plate and intimately sandwiched between said spaced plates;

a pair of terminals seated against the other of said faces and the other of said spaced plates, the terminals being substantially coextensive in area with the faces and spaced discs to hold the element and the plates sandwiched therebetween, a plurality of fusible conducting ribbons extending between said spaced plates respectively, and located outboard the same and at peripherally spaced positions thereabout, the cross-section of said ribbons being such that they fuse and interrupt the circuit between the terminals when current flow indicative of semiconductor failure occurs, and a casing secured to the terminals to enclose and maintain the integrity of the assembly of the element and plates.

* * * * *